July 13, 1954  S. V. PALLADINO, JR  2,683,783
FLUID LEVEL SIGNAL
Filed July 13, 1951

INVENTOR.
Steve V. Palladino, Jr.
BY
William H. Parsons
Attorney

Patented July 13, 1954

2,683,783

UNITED STATES PATENT OFFICE 2,683,783

FLUID LEVEL SIGNAL

Steve V. Palladino, Jr., Bradenton, Fla.

Application July 13, 1951, Serial No. 236,623

2 Claims. (Cl. 200—84)

The present invention pertains to a fluid level signal which is electrically operated and is used in combination with the hydraulic brake system of an automobile or other vehicle, for the purpose of indicating to the vehicle operator the level of the brake fluid in the master cylinder reservoir of the brake system.

The maintenance of sufficient fluid in the brake system is of the utmost importance in that when there is an inadequate amount of fluid in the system or master cylinder, operation of the vehicle is extremely dangerous as a complete failure of brakes is quite liable to occur. With no fluid in the system the brakes could not operate and when the fluid is below a predetermined level air can enter the brake system and impair the operation of the brakes to such an extent that an accident can occur in the operation of the vehicle.

The invention is illustrated and described in combination with the hydraulic brake system of a vehicle but it is to be understood that the invention is not necessarily limited to such a use because the present signal could be utilized to indicate the low level of any fluid in any type of reservoir or container such as gasoline within a vehicle tank; oil in an engine crankcase; or water in an electric battery.

In the following description references to a signal are to be understood to include any type of visual signal, such as an electric light, or any type of audible signal such as a buzzer or electric bell.

The primary object of the invention is the provision of an electric signal in combination with a hydraulic brake system for indicating the level of the fluid in the system.

Another object of the invention is the provision of a signal of the character described which, in addition to being suitable installation on a new vehicle, is equally suitable for easy and comparatively cheap installation on vehicles already manufactured and in use.

A still further object of the invention is the provision of a signal of the character described which is compact; comparatively simple and cheap of construction and installation; and due to its simplicity is not liable to break-down or failure of operation.

Another object of the invention is the provision of a signal of the character described which embodies a switch carried by the filling cap of the master cylinder reservoir of the braking system and is removable with said cap when replenishment of fluid in the reservoir is necessary.

Another and still further object of the invention is the provision of a signal of the character described having a construction and operation particularly suited for use on a moving vehicle where the fluid is in motion.

Other and further objects, advantages and novel features of construction of the invention will appear and be understood from the following description when read in the light of the accompanying drawings.

Figure 4:
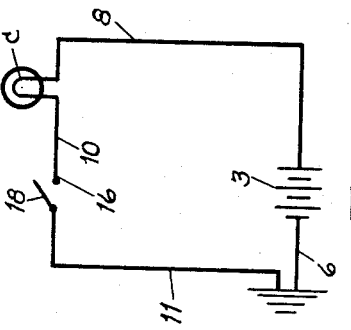
Figure 4 is an illustration of the electric circuit utilized in the invention.

In the following description similar reference numerals and characters are used to designate in the drawings similar parts, and having reference to the drawings, the master cylinder reservoir of the braking system is designated A and is provided with a removable filler cap B. The cap illustrated is the one provided by the manufacturer of the reservoir and, as will later appear, the switch of the signal is associated with this cap.

Figure 1:
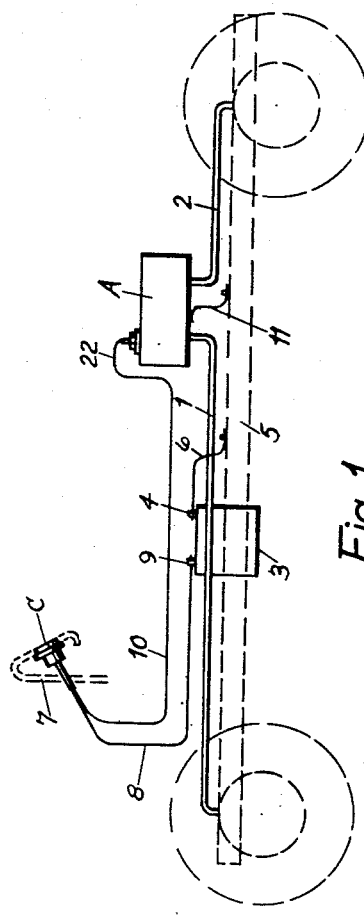
Figure 1 illustrates the invention as used in combination with the braking system of a vehicle, the pertinent parts of the vehicle being illustrated in dotted lines.

Having reference to Fig. 1, suitable conduits 1 and 2 extend from the reservoir to the front and rear brakes respectively and these in accordance with the customary practice, are usually flexible in nature. There is the usual conventional electric battery 3 having one of its terminals 4 grounded to the vehicle chasses 5 by a conductor 6. The electric signal of the present invention is designated as an entirety by C and is mounted on the vehicle dash 7. A current conducting wire 8 extends from the second battery terminal 9 to the dash positioned signal and another current conducting wire 10 extends from the signal for attachment to the switch, in a manner hereinafter to be described, and the reservoir is grounded to the vehicle chassis by a conductor 11.

Having reference now to Figs. 2 and 3 of the drawings, the switch which is in combination with the filler cap B, will be described. A current conducting wire 12 extends through the cap top 13 and is insulated therefrom by a suitable covering of insulation 14. This wire has an upper bared end 15 and below the cap and within the reservoir with a bared end 16 bent to be disposed in substantially a horizontal plane. A float D is pivotally suspended from the cap as at 17 on an arm 18. The connection of the arm 18 to the cap B is such as to provide an electrical contact between the arm and the cap and the cap through its threaded engagement with the reservoir is in current conducting contact therewith. The float is in engagement with the brake fluid 19 and in accordance with the level thereof will swing, in a pendulum-like fashion, so that when the fluid is below a predetermined level the float arm 18 will electrically contact the end 16 of the wire 12, as illustrated at 20 in Fig. 2, or be out of electrical contact with said wire end 16, as illustrated in Fig. 3, when the fluid level is sufficiently high as to provide adequate fluid in the cylinder.

Figure 3:
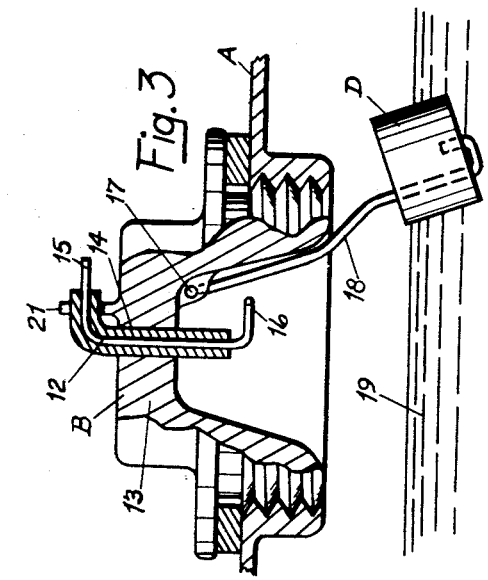
Figure 3 is a fragmentary view similar to Fig. 2, the switch being illustrated in an open position such as it assumes when the liquid level is adequately high.
Figure 2:
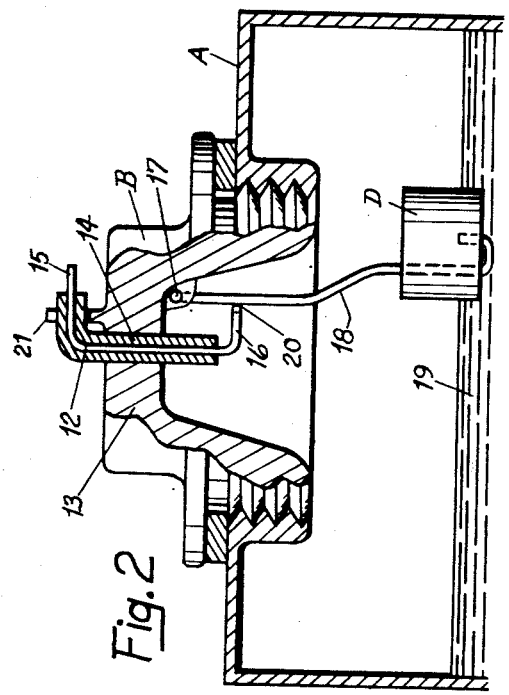
Figure 2 is a vertical sectional view through the master cylinder brake reservoir illustrating the electric switch of the signal, the switch being shown in the closed position it assumes when the liquid level is low.

It will be understood that when the float is in the position illustrated in Fig. 2 the electric circuit is closed and will bring the signal C into operation, whereas when the float is in the position illustrated in Fig. 3 the electric circuit is open and the signal C is out of operation.

The electric circuit is illustrated in Fig. 4 of the drawings.

To prevent rotation of the wire 12 its upper end is disposed between a pair of arms, one of which is designated at 21, which provide in effect a fork which locks the wire against rotation in the cap.

Inasmuch as the filler cap must from time to time be removed to replenish the fluid in the reservoir it is intended that the end 22 of the wire 10 be provided with some suitable clip so that it can be quickly and easily connected to and detached from the bare upper end 15 of the wire 12. No specific clip is illustrated as any of those well known and in common use can be utilized.

From the foregoing it will be understood that when the fluid falls beyond a predetermined level the electric circuit will be closed and the vehicle operator will be warned either visually or audibly by the signal C. Inasmuch as the movement of the vehicle and the fluid 19 will, when the fluid level is low, cause a periodic making and breaking of the electric circuit through the float arm 18, the signal will be periodically operated and this will bring the attention of the vehicle operator to the signal.

Further description of the operation of the device is unnecessary as it should be fully understood from the foregoing, and as departures from the specific construction illustrated and described can be made without departing from the inventive concept, the invention is to be limited, therefore, only by the scope of the hereinafter following claims.

What I claim is:

1. In a vehicle having a hydraulic brake system, a master cylinder reservoir having fluid therein and provided with a removable filler cap, an electric circuit, a switch in said circuit carried by and removable with said filler cap and comprising a current conductor extending through and insulated from said filler cap, said conductor provided within the reservoir and beneath said filler cap with a horizontally offset contact terminal, a float provided with an extended supporting arm composed of a current conducting material, the extending end of said arm being pivotally and electrically connected to the filler cap to suspend said float as a pendulum within said reservoir and beneath said cap, the pivotal support of said float arm being positioned to normally dispose said arm vertically beneath said cap and in abutted electrical contact with the horizontally offset terminal of said conductor, and said float supporting arm being movable into and out of said electrical contact with said conductor terminal with arcuate movement thereof about its point of pivotal support in response to changes in the fluid level within said reservoir.

2. In a vehicle having a hydraulic brake system, a master cylinder reservoir having fluid therein and provided with a removable filler cap, an electric circuit, an electric battery having one terminal thereof connected to a ground, the master cylinder being composed of a current conducting material and being connected to the same ground, the other terminal of the battery being provided with a current conductor detachably connected to a switch, said switch being carried by and being removable with the reservoir filler cap, said switch including an electric wire detachably connectable to said second battery terminal, said wire extending through said filler cap and being insulated therefrom, said wire being provided below said filler cap and within said reservoir with a horizontal offset contact terminal, a float within the reservoir and beneath said filler cap provided with an extended supporting arm, the extended end of said float supporting arm being pivotally connected to the under side of said filler cap to suspend the float as a pendulum from beneath said cap, said supporting arm being pivotally connected to said cap to normally position said arm vertically and in electrical contact with said conductor wire offset terminal, said supporting arm having electrical contact with said filler cap, said filler cap having electrical connection with said reservoir, and said float supporting arm being movable into and out of electrical contact with said conductor wire terminal with arcuate movement of said float in response to changes in the fluid level of said reservoir.

References Cited in the file of this patent

UNITED STATES PATENTS

| Number | Name | Date |
|---|---|---|
| 437,369 | Tschira | Sept. 30, 1890 |
| 1,902,933 | Zubaty | Mar. 28, 1933 |
| 2,161,441 | Vickers | June 6, 1939 |
| 2,494,802 | Fox | Jan. 17, 1950 |
| 2,613,293 | Marks | Oct. 7, 1952 |